(12) United States Patent
Blaylock (10) Patent No.: US 10,801,357 B2
(45) Date of Patent: Oct. 13, 2020

(54) TURBOCHARGER WITH A PIVOTING SLIDING VANE FOR PROGRESSIVELY VARIABLE A/R RATIO

(71) Applicant: Jimmy L. Blaylock, Baxter Springs, KS (US)

(72) Inventor: Jimmy L. Blaylock, Baxter Springs, KS (US)

(73) Assignee: Switchblade Turbo, LLC, Baxter Springs, KS (US)

( * ) Notice: Subject to any disclaimer, the term of this patent is extended or adjusted under 35 U.S.C. 154(b) by 56 days.

(21) Appl. No.: 16/280,601

(22) Filed: Feb. 20, 2019

(65) Prior Publication Data

US 2020/0263559 A1 Aug. 20, 2020

(51) Int. Cl.
*F01D 9/02* (2006.01)
*F01D 17/14* (2006.01)
(Continued)

(52) U.S. Cl.
CPC .......... *F01D 17/143* (2013.01); *F01D 9/026* (2013.01); *F01D 25/24* (2013.01); *F02B 37/24* (2013.01);
(Continued)

(58) Field of Classification Search
CPC ........ F01D 9/026; F01D 17/143; F01D 25/24; F02B 37/24; F05D 2220/40; F05D 2240/12; F05D 2260/57
See application file for complete search history.

(56) References Cited

U.S. PATENT DOCUMENTS

| 2,944,786 A | 7/1960 | Angell et al. |
| 3,190,068 A | 6/1965 | Williams et al. |

(Continued)

FOREIGN PATENT DOCUMENTS

| DE | 3105179 | 9/1982 |
| DE | 102007058246 A1 | 6/2009 |

(Continued)

OTHER PUBLICATIONS

Jay K Miller, "Turbo: Real World High Performance Turbocharger systems 45", Publisher: CarTech 2008.
(Continued)

*Primary Examiner* — Igor Kershteyn
(74) *Attorney, Agent, or Firm* — Gable Gotwals (57) ABSTRACT

An improvement to a turbocharger having a housing (10) with a slot (25) located along a midline of the housing (10) above the turbine wheel (29) and a tongue (15) defining the end of an initial inlet throat area (11) of the housing (10), the slot (25) permitting inlet exhaust gas which flows past the tongue (15) to flow into the turbine wheel (29), the improvement being a pivoting vane (50) aligned with the slot (25) and having an upstream end (55) located at a downstream end (57) of the tongue (15). When the vane (50) is in its fully closed position (60), the inlet exhaust gas is prevented from flowing into the slot (25) and, therefore, the turbine wheel (29), until the inlet exhaust gas passes the downstream end (57) of the vane (50). The vane (50) effectively extends the tongue (15) to define a revised inlet throat area (12). The A/R ratio of the housing (10) progressively varies as the vane (50) pivots between the fully opened (70) and fully closed (60) positions.

20 Claims, 7 Drawing Sheets

(51) Int. Cl.
*F01D 25/24* (2006.01)
*F02B 37/24* (2006.01)

(52) U.S. Cl.
CPC ...... *F05D 2220/40* (2013.01); *F05D 2240/12* (2013.01); *F05D 2260/57* (2013.01)

(56) References Cited

U.S. PATENT DOCUMENTS

| | | | |
|---|---|---|---|
| 3,313,518 A | | 4/1967 | Nancarrow |
| 3,363,412 A | | 1/1968 | Fischer et al. |
| 3,396,534 A | | 8/1968 | Bernson et al. |
| 3,844,676 A | * | 10/1974 | Betteridge ............ F01D 17/146 415/156 |
| 4,177,005 A | | 12/1979 | Bozung et al. |
| 4,177,006 A | * | 12/1979 | Nancarrow .......... F02B 37/025 415/151 |
| 4,389,845 A | * | 6/1983 | Koike .................. F01D 9/026 415/145 |
| 4,512,714 A | | 4/1985 | Kaesser |
| 4,519,211 A | * | 5/1985 | Sedille ................ F01D 17/146 60/602 |
| 4,658,586 A | * | 4/1987 | Iwasa .................. F02B 37/18 60/602 |
| 4,660,382 A | * | 4/1987 | Ueno ................... F01D 17/146 60/602 |
| 4,678,397 A | | 7/1987 | Komatsu et al. |
| 6,073,447 A | * | 6/2000 | Kawakami ............ F01D 9/026 60/602 |
| 6,158,956 A | | 12/2000 | Arnold |
| 7,481,056 B2 | | 1/2009 | Blaylock et al. |
| 8,601,690 B2 | * | 12/2013 | Ebisu .................. F01D 17/146 29/889.2 |
| 9,291,092 B2 | * | 3/2016 | Sumser ................ F01D 17/105 |
| 2006/0230759 A1 | | 10/2006 | Semrau |
| 2010/0266390 A1 | | 10/2010 | Henderson et al. |
| 2011/0052374 A1 | | 3/2011 | Arnold |
| 2012/0036849 A1 | | 2/2012 | Watson et al. |
| 2016/0090857 A1 | | 3/2016 | Blaylock |

FOREIGN PATENT DOCUMENTS

| | | |
|---|---|---|
| JP | S6065207 A | 4/1985 |
| JP | S60261904 A | 12/1985 |

OTHER PUBLICATIONS

Sturgess, "Could SuperTurbocharger Become the Hero on Fuel Economy?", p. 4 Publisher: StreetSmarts; Sep. 2010.

\* cited by examiner

TURBOCHARGER WITH A PIVOTING SLIDING VANE FOR PROGRESSIVELY VARIABLE A/R RATIO

BACKGROUND

This disclosure relates generally to turbochargers for motor vehicles and, more specifically, to means for progressively varying the A/R (Area/Radius) ratio of a turbocharger.

Turbochargers are well known devices used in all forms of vehicles for supplying air to the intake of an internal combustion engine at pressures above atmospheric pressure ("boost pressures"). A conventional turbocharger includes a turbine rotor or wheel with a plurality of fins or blades inside a volute turbine housing. The turbine rotor is rotated by exhaust gases from the engine which impinge upon the turbine blades. The rotor, via a connecting shaft, provides the driving torque to a compressor. Ambient air fed to the compressor creates a boost pressure that is fed to the intake manifold of the engine.

The flow capacity of the exhaust turbine is a function of the housing volute areas and the passage of the exhaust gases as it strikes the turbine blades. The flow of exhaust gas has to be regulated to control the compressor speed to create the desired boost in manifold pressure. A typical centrifugal compressor includes an impeller driven at high speed by the turbine rotor. A diffuser surrounding the impeller causes the ambient air to increase in pressure which is directed to the intake manifold.

One particular goal with any turbocharger is the need for a quick response, i.e., prevent "turbo lag," a delay between the time when high power output is first demanded of the engine by setting the throttle to a wide-open position and the time when a boost in the inlet manifold air pressure is delivered by the compressor. In some instances, turbo lag could result in a dangerous driving situation when substantially instantaneous response is desired. If the turbocharger is large enough to provide the maximum horsepower for an internal combustion engine, then it will have excessive and potentially unsafe lag when the throttle is increased. If the turbocharger is reduced in size to minimize turbo lag, then efficiency is lost at higher engine rpms.

Some early turbocharger designs sought to solve the problem of turbo lag within a certain range of low engine speeds, such as when the engine is idling, by adding a regulated air supply to increase the mass of air entering the turbocharger intake and being forced into the engine manifold. At idle speed, the engine exhaust is insufficient to maintain the speed and charging-air output of the compressor section of the turbocharger, causing the turbocharger to "lag behind" the engine in performance. To maintain the speed of the turbocharger, a pair of nozzles penetrates the housing in opposite directions and injects air generally tangentially to the outer tips of the rotor blades. The air pressure provided by the nozzles acts as a "jet assist" in the turbocharger compressor when the engine is at idling speed (see U.S. Pat. No. 3,190,068 to Williams et al., Turbocharger for Compressor Driving Engine, issued Jun. 22, 1965, and U.S. Pat. No. 3,363,412, to Fischer et al., System for Maintaining Turbocharger Compressor Speed, issued Jan. 16, 1968). Another design positions nozzles at preselected points about the turbine rotor and directs air through the nozzles to impinge the blades and, in addition to providing a jet assist, prevent resonant vibration conditions in the rotor for its entire rotational speed range (see U.S. Pat. No. 3,396,534 to Bernson et al., Air Impingement Nozzle Arrangement for a Turbocharger Compressor and an Improved Method of Employing Air Impingement, issued Aug. 13, 1968).

The air-assisted designs do not operate to minimize turbo lag when the turbocharger is already in a spun-up condition and the engine is at normal operating speed but requires additional horsepower. Furthermore, the air-assisted designs require a waste gate to handle the total exhaust flow at maximum horsepower.

Other designs have proposed variable volute turbines; variable geometry turbines; electrically driven turbines; moveable or pivoting vanes, gates and walls for guiding, dividing, or changing the direction the exhaust gases relative to the turbine rotor and thereby control its rotational speed.

Variable volute turbines make use of a sliding or flexible dividing wall to change the geometry of the volute and, therefore, the flow of exhaust gas into the turbine wheel. One example of a variable volute design is U.S. Pat. No. 4,177,005 to Bozung. The design can be slow in responding to sudden changes, is used solely as a braking application, and its performance can be negatively affected by debris build-up on the sliding wall surfaces. Another example is US 2011/0052374 to Arnold. This design makes use of a flexible dividing wall that moves along a path to vary the discharge area into the turbine wheel. The design is complicated and failure-prone because the chain and bearing mechanism used to move the wall are in the path of the hot exhaust flow.

Variable geometry turbochargers use adjustable guide vanes arranged about the turbine wheel in order to control exhaust gas flow to the wheel. These designs require a large number of expensive components along with sophisticated software and controls.

Electrically driven turbines essentially turn the shaft of the turbine rotor into an armature. Because the armature must be disengaged once the turbine rotor spins up to a certain speed, these designs entail complicated electro-mechanical structures.

A moveable wall design for a variable geometry turbocharger is disclosed in US 2012/0036849A1 to Watson et al. ("the Watson publication"). A pivoting wall located along the upper wall of the housing pivots about a point located upstream of the housing tongue and near the entry to the housing (compare U.S. 2010/0266390 to Henderson et al. showing a pivoting wall located far downstream of the tongue). As the wall pivots away from the upper wall, the wall reduces the volume of exhaust gas flowing into the volute. Alternatively, a rotating wedge segment can be located along the upper wall of the housing and moved downstream to alter the cross section of the volute. However, neither the wall nor the wedge can prevent exhaust air from flowing into the turbine wheel even when fully closed or deployed, nor can either one alter or extend the end of the housing tongue. Additionally, an equal amount of exhaust cannot flow over and under of the pivoting wall or wedge because there is no neutral position.

A moveable or variable vane design, which is intended to minimize the occurrence of turbo lag, is described in U.S. Pat. No. 7,481,056 to Blaylock et al., Turbocharger with Adjustable Throat, issued Jan. 27, 2009 and incorporated by reference herein ("Blaylock"). A flow control gate is positioned in the center of the inlet to the housing on the exhaust side of the turbocharger and adapted, from a command, to momentarily rotate or pivot downstream about a transverse hinge from a neutral first position to a second position toward the blades of the turbine rotor. (There is no open position above the neutral position.) In the second position, the control gate reduces the volume of exhaust gas flowing along an inner flow path toward the turbine rotor and increases the air velocity and pressure upon the turbine rotor. This causes the turbocharger to reach optimal operating speed to substantially reduce or eliminate harmful emissions while increasing initial engine takeoff power and reducing lag time from when speedup was first signaled by the operator. Once the turbine is spun up, the control gate returns to a neutral position. When in the neutral position, the operation of the turbocharger is as a standard turbocharger. The typical time for the gate action is a very small part of a second before returning to the neutral position. A properly sized turbocharger could eliminate the need for a waste gate and the turbocharger could be large enough to handle the total exhaust flow at maximum horsepower.

Still others have mechanically coupled the turbocharger to the engine. This type of arrangement, called "turbocompounding,' is described in the September 2010, North American edition of the trade magazine, Diesel Progress (see "Could SuperTurbocharger Become the Hero on Fuel Economy?"). The turbocharger adds a small additional horsepower boost through the combination of the turbocharger and its transmission. However, turbocompounding entails complexity and involves additional production cost all in hopes of achieving at most a 7% fuel savings on diesel engines.

A flow control gate which momentarily alters the A/R (Area/Radius) ratio of a turbocharger in order to eliminate turbo lag is desirable (compare DE 31 05 179 A1 which discloses a gate that lies along the outer wall of the housing and outside the inlet or throat section and, therefore, cannot alter the A/R ratio of the housing). It is well known in the art that the A/R ratio is the inlet cross sectional area dived by the radius from the turbo centerline to the centroid of that area. The inlet (or throat section) of a turbocharger extends between the end of the housing which mounts to the exhaust manifold and the tip or end of the tongue of the housing. To calculate the A/R ratio, the area of the turbine housing is measured in square inches of a cutting plane line that passes through the turbine's gas passage at the tip of the tongue, divided by the radius from the center of the turbine wheel's axis of rotation, to the centroid of the volute. The tongue tip is the entry point of the turbine housing where exhaust gas flow begins to reach the turbine wheel inducer.

(see Jay K. Miller, *Turbo: Real World High Performance Turbocharger Systems* 45 (CarTech 2008)).

From the above, it is clear that:
1. The "A" in the A/R ratio is determined by the cross-sectional area defined by a cutting plane line that passes through the turbine's gas passage at the tip of the tongue to the opposing wall of the inlet channel;
2. The inlet area A can be changed by making a new housing with a different sized area A; and
3. The throat or inlet extends to the end of the tongue but not beyond it.

The ability to alter the area of the inlet is important. For example, reducing the throat cross-section results in higher boost pressures. Turbocharger housings are designed with different A/R ratios along with complicated means (e.g., variable geometry turbines) to achieve the desired performance. Other than Blaylock's flow control gate which attempts to adjust the throat, the A/R ratio in prior art pivoting vane designs remains fixed because, absent making a new housing, there is no way for those designs to alter either the throat area or the radius from the center of the turbine wheel. However, Blaylock cannot alter where the tongue tip or tongue end of the housing begins and ends in real time and, because of the location of the pivot point (at about the center of the vane), cannot close flow completely.

US 2016/0090857 to Blaylock, incorporated by reference herein, discloses a turbocharger with a progressively variable A/R ratio that extends the inlet throat area to close flow to the turbine wheel until inlet exhaust gas passes the downstream end of the vane. The turbocharger includes a pivoting vane of fixed length aligned with the volute slot and located at a downstream end of the inlet throat area. When the vane is in its fully closed position, the inlet exhaust gas is prevented from flowing into the slot and, therefore, the turbine wheel, until the inlet exhaust gas passes the end of the vane. The A/R ratio of the housing progressively varies as the vane pivots between the fully opened and fully closed positions. The length of the vane can be any length that provides a desired A/R ratio when the vane is in the fully closed position yet still clear the turbine wheel when moving into the fully opened position, with shorter lengths being less effective than longer lengths. The vane could extend slightly past 180° of the turbine wheel housing but anything more than 185° would require additional means to pivot the vane away when moving toward the open position and still clear the turbine wheel housing.

SUMMARY

Embodiments of a turbocharger of this disclosure comprise a housing including a volute containing an inlet throat section and a volute slot; and a dual vane co-aligned with the volute slot, an upstream end of the dual vane located in proximity to a downstream end of the inlet throat section. The dual vane includes a primary vane and a secondary vane, the secondary vane disposed on an upper surface of the primary vane and shaped complementary to the primary vane, the primary vane configured to pivot away from and toward the volute slot between a fully opened position and a fully closed position, the secondary vane configured to slide between a fully retracted position and a fully extended position. The secondary vane is in the fully retracted position when the primary vane pivots between the fully opened and closed positions. An area/radius (A/R) ratio of the housing varies as the primary vane pivots between the fully opened and closed positions. The A/R ratio of the housing also varies as the secondary vane slides between the fully extended and retracted positions.

When in the fully closed position, a portion of the volute slot lying opposite the dual vane is blocked and the secondary vane may extend from the fully retracted position. The dual vane essentially extends the inlet throat by preventing inlet exhaust gas flowing over the vane from entering the volute slot until the exhaust gas passes the far end of the vane. When the secondary vane is extended, an additional portion of the volute slot lying opposite the dual vane is blocked. In a fully closed and fully extended position, the dual vane may block up to 360° of the volute slot, effectively functioning as an exhaust brake.

The primary vane may include a hole at its upstream end that receives a cross shaft. In some embodiments, the primary vane includes a channel located on its upper surface, with at least a portion of the secondary vane located within the channel, extendable from and retractable into the channel. A downstream end of the secondary vane may include a stop configured to prevent the secondary vane from entering the volute slot during extension and retraction.

Embodiments may include a push rod having one end pivotally connected to the secondary vane and another end located outside of the housing. An "ear" may be added to the housing to accommodate the push rod. The push rod may be configured to pivot the primary vane between the fully opened and closed positions and, when the primary vane is in the fully closed position, extend and retract the secondary vane. The dual vane may further include an upstream stop and a downstream stop. When the push rod contacts the upstream stop, the primary vane is permitted to pivot between the fully opened and closed positions. When the push rod moves between the upstream and downstream stops, the secondary vane is permitted to slide between the fully extended and retracted positions, the fully extended position being when the push rod contacts the downstream stop, the fully retracted position being when the push rod contacts the upstream stop. The upstream and downstream stops may be spaced according to a predetermined length of arc depending, in part, on the amount of full extension desired.

A method for progressively varying an area/radius ratio of a turbocharger housing includes pivoting the primary vane between the fully opened and fully closed positions, wherein during the pivoting the secondary vane remains in the fully retracted position; and sliding the secondary vane between the fully retracted and fully extended positions when the primary vane is in the fully closed position; wherein a portion of the volute slot lying opposite the primary vane is blocked when the primary vane is in the fully closed position; and wherein an additional portion of the volute slot is lying opposite the secondary vane is blocked when the secondary vane slides toward the fully extended position.

Objectives of this disclosure are to provide a dual vane configured for use in a turbocharger, the dual vane (1) is simple in its design and control; (2) can be retrofitted to existing turbocharger designs; (3) "spins up" the turbine wheel quickly; (4) progressively varies the A/R ratio past 180° or 185° of the volute slot; (5) does not create turbulence when varying the A/R ratio; (6) does not create backpressure in the inlet throat area; (7) eliminates the need for a waste gate and other complicated structures intended to control back pressure; and (8) may provide an exhaust brake.

ELEMENT NUMBER AND ELEMENTS USED IN THE DRAWINGS

Figure 1:
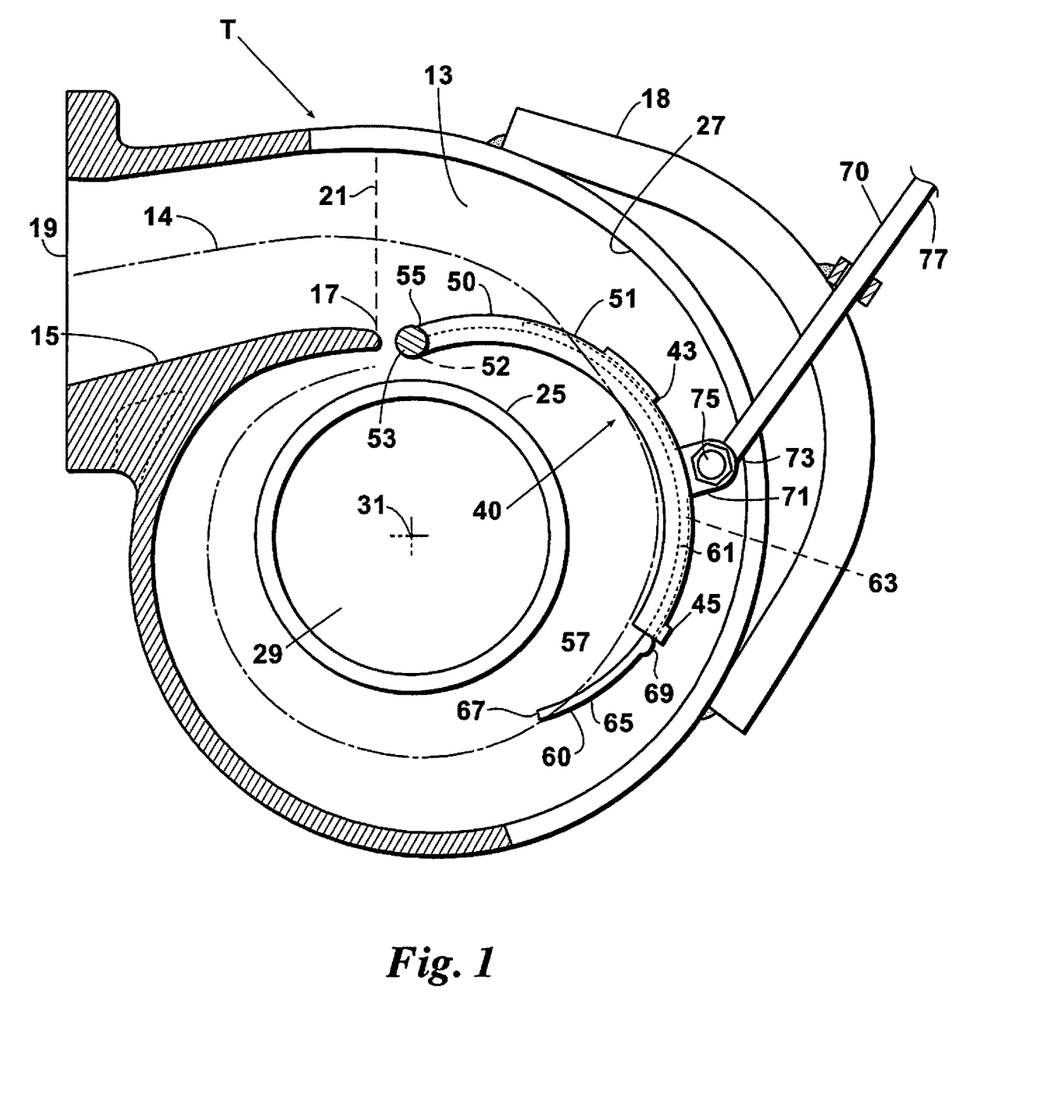
FIG. 1 is a cross section of an embodiment of a turbocharger equipped with a dual vane of this disclosure. The dual vane is arranged proximal to a downstream end of the inlet throat section and above, and aligned with, a midline of the volute slot. One portion of the vane pivots toward and away from the volute slot and another portion of the dual vane extends and retracts about the volute slot. The means to pivot the vane may be located at or near a downstream end of the tongue, thereby not obstructing the original throat or inlet section area.
Figure 2:
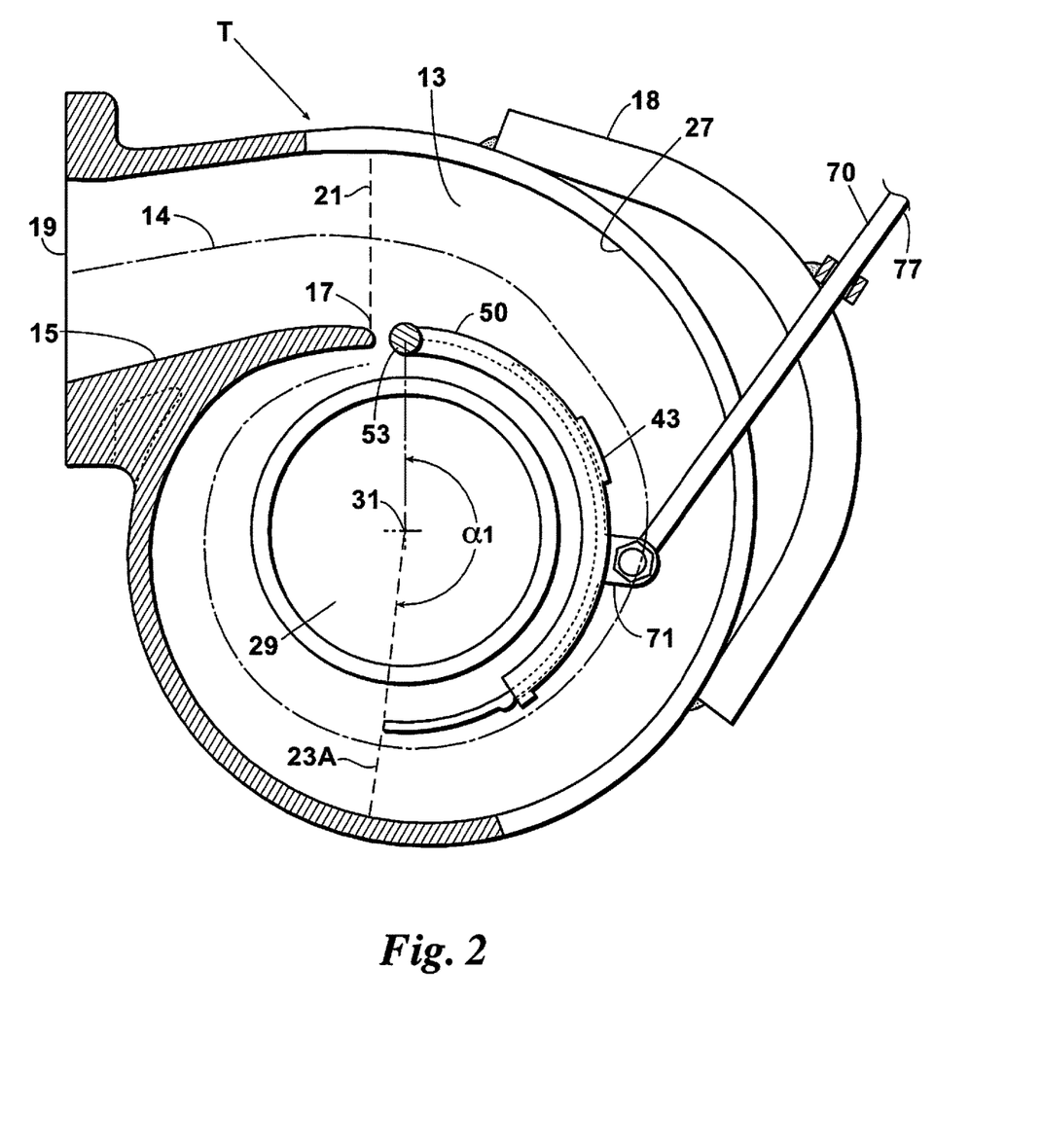
FIG. 2 is a cross section of the turbocharger of FIG. 1, with the primary vane in its fully closed position. When the primary vane pivots toward the turbine wheel, the vane effectively moves the end of the tongue (and, therefore, the inlet or throat section) farther downstream to a place of reduced cross-sectional area, thereby resulting in a reduced A/R (Area/Radius) ratio. In the fully closed position, the dual vane blocks the volute slot and prevents inlet exhaust gas from entering the volute slot, and therefore the turbine wheel, until the gas flows past the downstream end of the dual vane.
Figure 3:
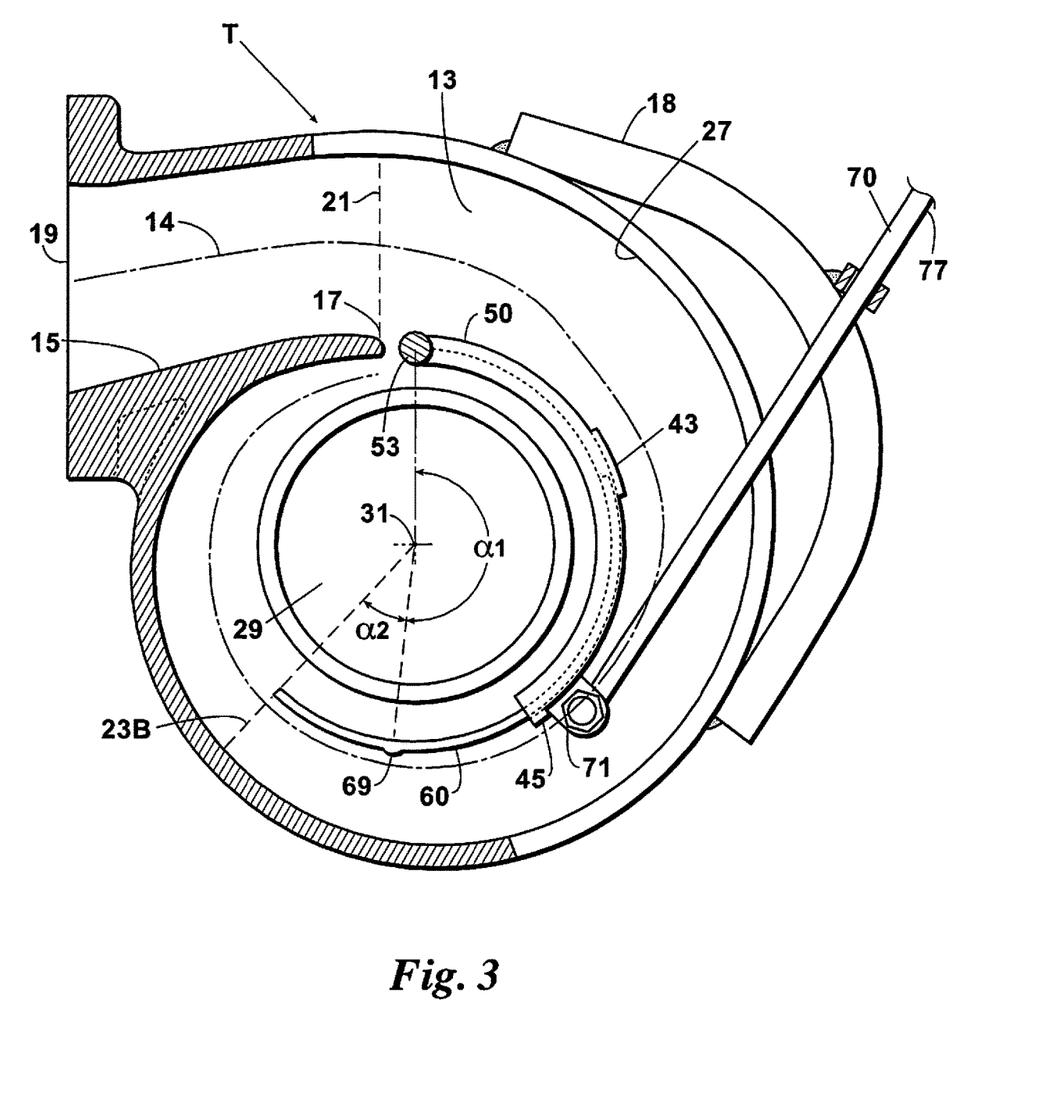
FIG. 3 is a cross section of the turbocharger of FIG. 1, with the primary vane in its fully closed position and further extended by a secondary vane. As the secondary vane extends, inlet exhaust gas flowing over the dual vane is prevented from entering the volute slot until it passes the far end of the secondary vane. A push rod pivotally connected to the secondary vane may be used to pivot the primary vane and extend (and retract) the secondary vane. The secondary vane may slide over the primary vane, blocking farther downstream past 180°.
Figure 4A:
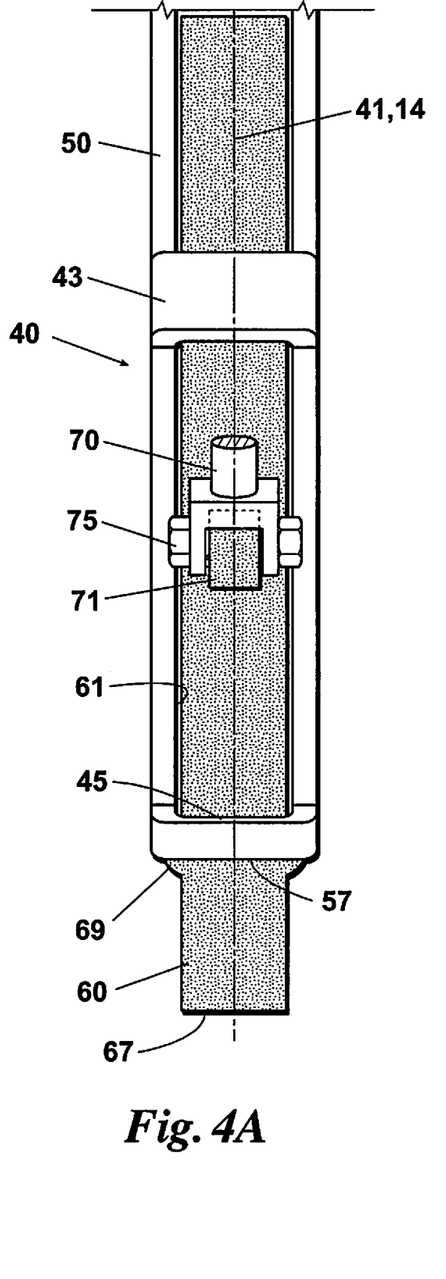
FIG. 4A is a partial top plan view showing the dual vane when the vane is in an open position. The vane is aligned with the midline of the volute slot.
Figure 4B:
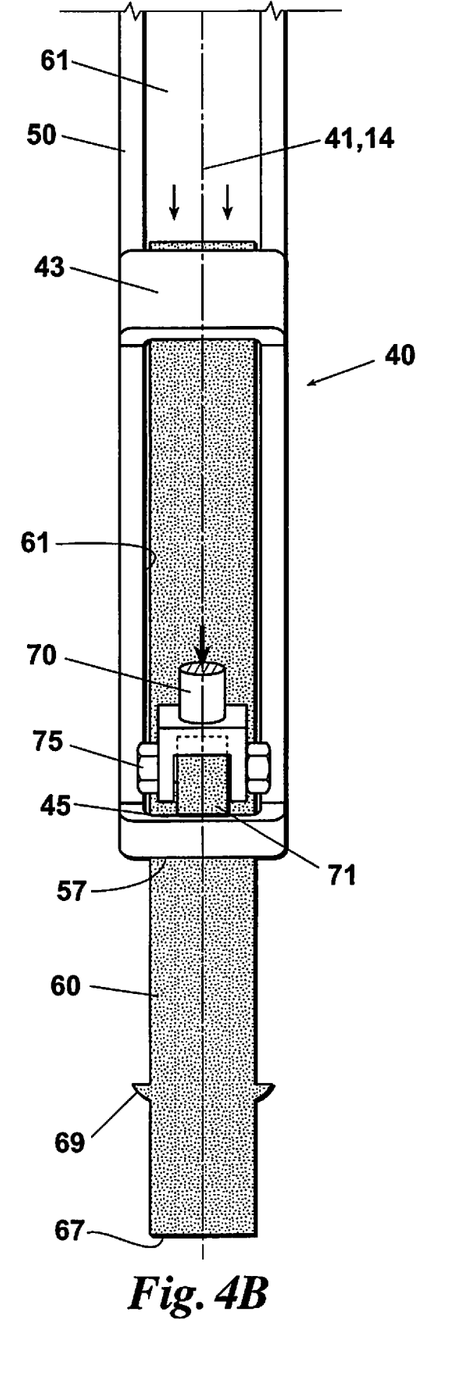
FIG. 4B is a partial top plan view showing the dual vane when closed and extended.
Figure 5:
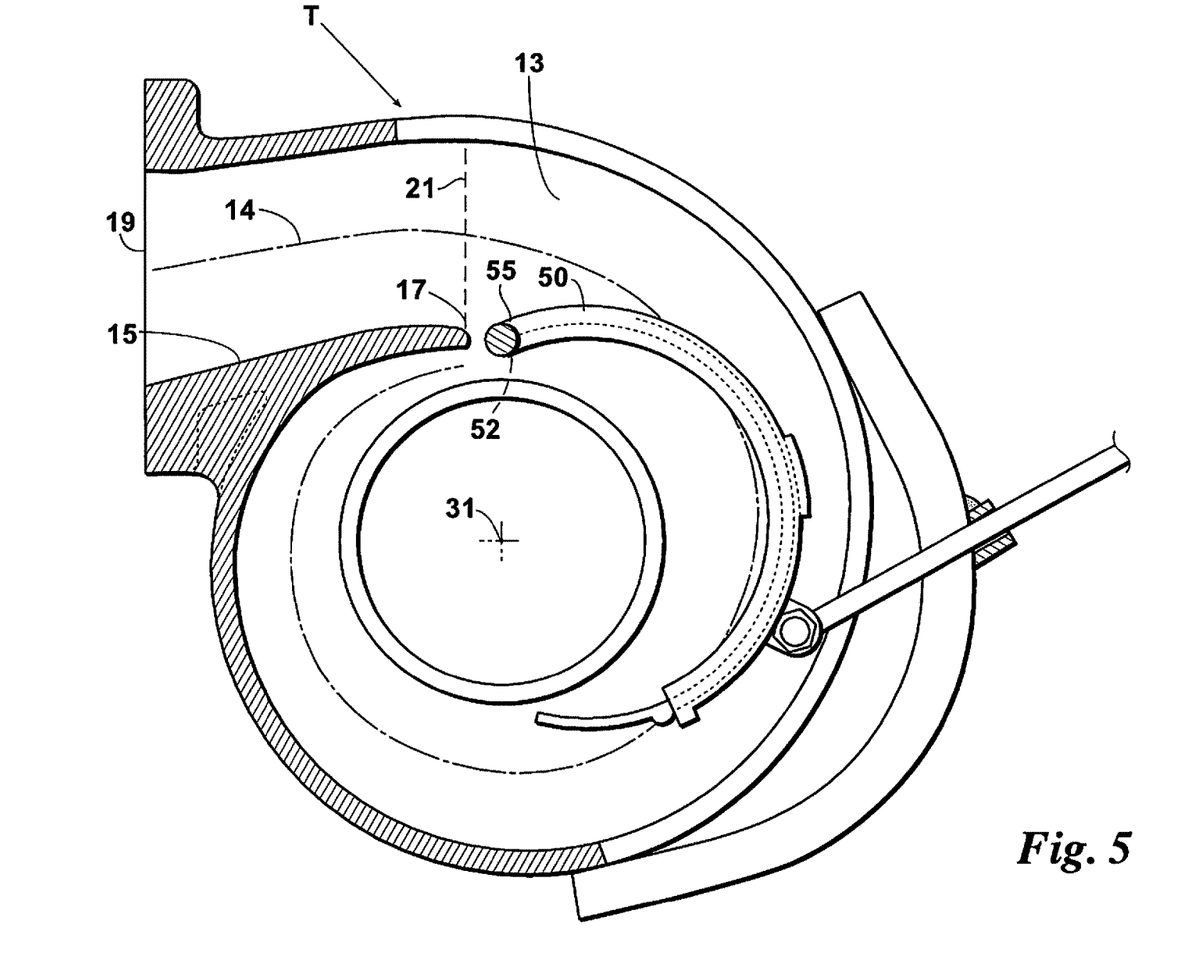
FIG. 5 is an embodiment configured to extend farther downstream than the embodiment of FIG. 1. The dual vane is shown in the fully opened position.
Figure 6:
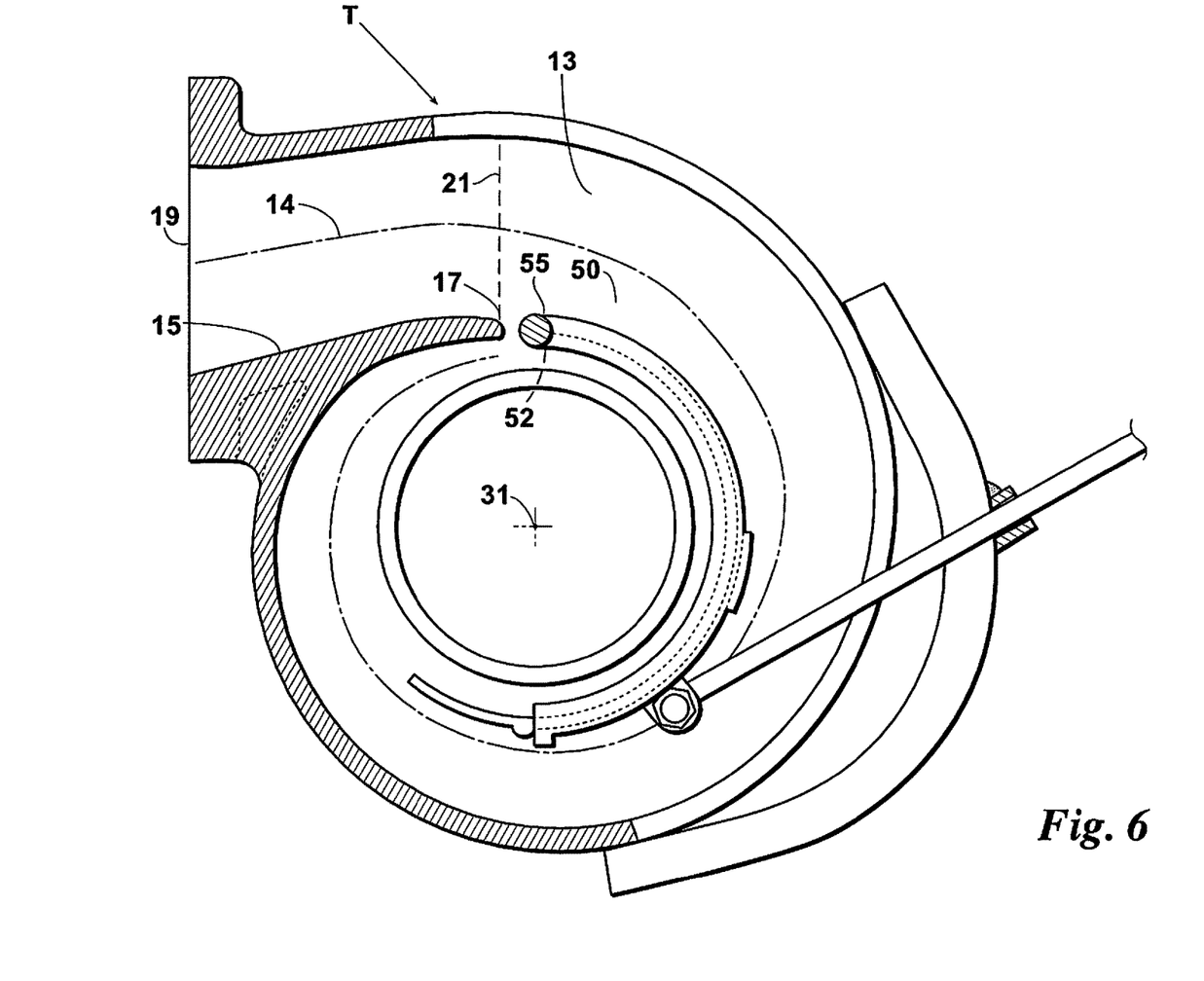
FIG. 6 is the embodiment of FIG. 5 when the dual vane is in the fully closed position.
Figure 7:
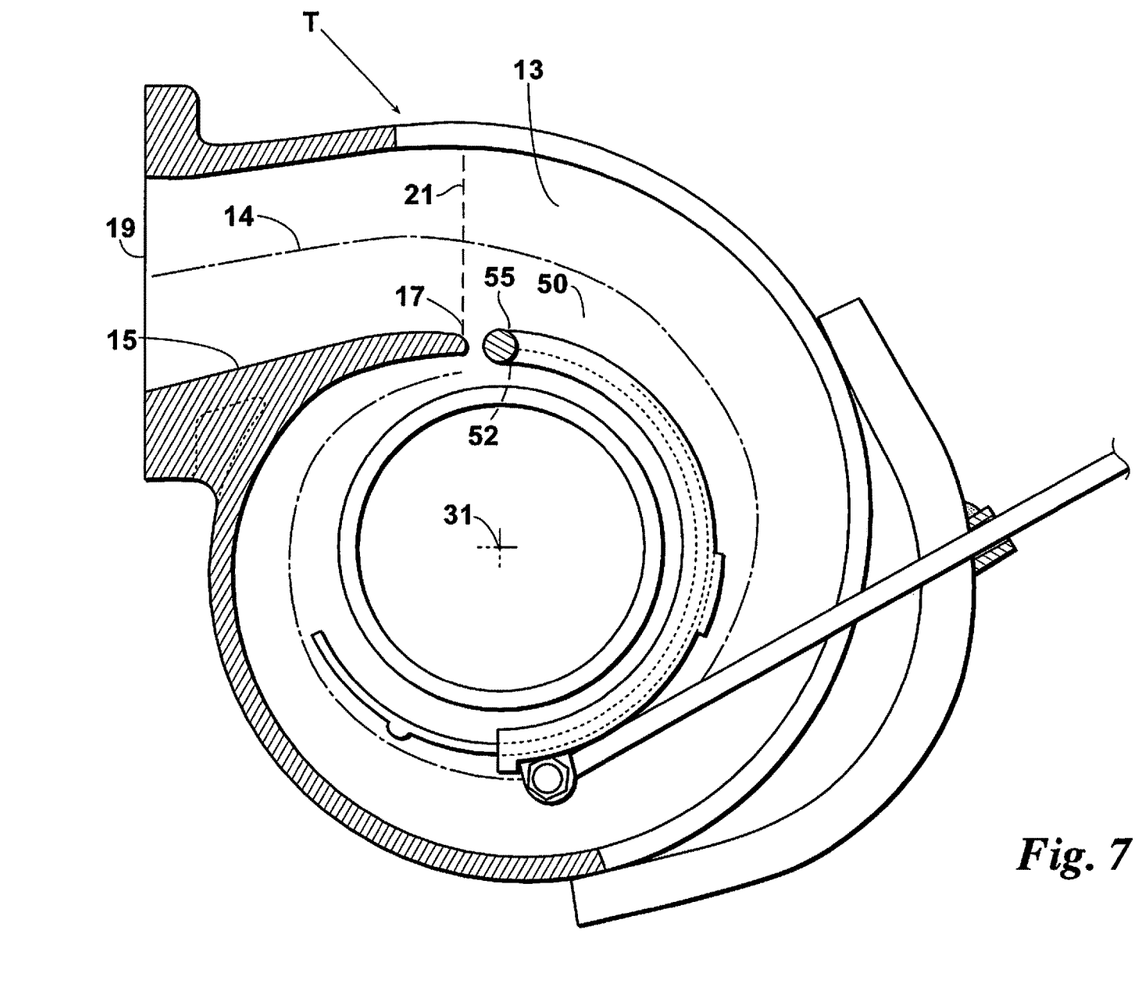
FIG. 7 is the embodiment of FIG. 5 when the vane is in the fully closed and extended position.

10 Housing
11 Inlet passageway or inlet throat section
12 Extended inlet passageway or throat section
13 Volute
14 Horizonal centerline
15 Tongue
17 Tongue tip or downstream end
18 Ear
19 Exhaust gas inlet side
21 Cross section of 11 (initial throat)
23 Reduced cross section downstream of 11 (extended throat)
25 Volute slot above turbine inducer or wheel
27 Volute wall
29 Turbine inducer or wheel area
31 Center axis of rotation
33 Vertical centerline of 25
40 Dual vane
41 Longitudinal centerline
43 Crosspiece (containing secondary vane 60)
45 First stop
50 Primary vane
51 Upper or top (wall facing) surface
52 Hole
53 Pin or cross shaft
55 Upstream end of 50
57 Downstream end of 50
60 Secondary vane
61 Slot or channel
63 Exposed portion
65 Upper or top (wall facing) surface
67 Downstream end
69 Second stop
70 Push rod
71 Connection
73 Vane end
75 Pin or shaft
73 Exposed end
T Turbocharger
Opened position
C Closed position
E Extended position
R Retracted position
α1 First portion of 25 blocked in closed position
α2 Second portion of 25 blocked during extension

DETAILED DESCRIPTION OF THE PREFERRED EMBODIMENTS

A turbocharger of this disclosure includes a dual or two-part vane located at or near a downstream end of the initial inlet throat area of the turbocharger housing, with one of the vanes configured to pivot toward and away from the turbocharger wheel and the other vane configured to slide about the wheel and prevent inlet exhaust gas from entering the wheel. The dual vane may be provided separate from the turbocharger or turbocharger housing and installed in the housing with associated control means. The turbocharger housing may be a radial inflow housing, meaning that the housing has a volute that continuously decreases in area and cross section to help maintain even pressure all the way around the turbine wheel. In embodiments, the dual vane is configured to block inlet exhaust gas flowing over the vane from entering the volute slot, and therefore the turbine wheel, located below that portion of the vane.

The pivoting or primary vane pivots toward and away from the turbine wheel between a fully opened and a fully closed position, there being intermediate positions in between. In the fully closed position, inlet exhaust gas flowing over the dual vane is prevented from entering the volute slot lying opposite the vane until it passes the far end of the dual vane. That portion of the volute slot is essentially blocked. In the fully opened position, the primary vane reaches its end of movement toward the housing wall opposite the turbine wheel. In some embodiments, in the fully opened position at least a portion of the dual vane is in contact with or in close proximity to the wall of opposite the volute, with inlet exhaust gas unevenly over and under the dual vane.

The sliding or secondary vane, which is shaped complementary to the primary vane and rides on top of the primary vane in sliding relationship to it, is configured to extend and retract from the far end of the primary vane. When in a fully extended position, the secondary vane reaches its end of travel around the turbine wheel. In embodiments, the secondary vane may be contained within a slot or channel located along an upper surface of the primary vane and sized to accommodate the secondary vane. The primary and secondary vanes may be sized to have a width equal to or greater than a width of the volute slot adjacent the turbine wheel.

A push rod connected to the secondary vane may be used to pivot the primary vane about is pivot point as well as extend and retract the secondary vane. Computerized control means may be configured to actuate and control the push rod and, therefore, the pivot and extension of the vanes. Changing the location of the primary vane's pivot point or the push rod's connecting point (or both points) affects the amount of pivot and extension. For example, the primary vane may pivot to a fully opened position in which a portion of the dual vane lies in contact with, or in close proximity to, an opposing wall surface of the volute. Or, the fully opened position may be a neutral position, the dual vane lying about equidistant from the opposing wall and the volute slot adjacent the turbine wheel.

During a pivot of the primary vane to a fully closed position from the fully opened position, the secondary vane remains in its fully retracted position. When the primary vane pivots into this fully closed position, the dual vane blocks a first portion of the volute slot and the secondary may vane may be extended to block an additional second portion of the volute slot. A stop may be placed on the secondary vane to prevent it from entering into the volute slot during extension and retraction When the secondary vane is retracted back to its fully retracted position and the primary vane is in its fully closed position, the primary vane may then pivot back to the fully open position.

In embodiments, the first portion of the volute slot blocked by the dual vane may be equal to the length of the primary vane, length being measured in degrees of arc. The additional portion blocked by the dual vane may be equal to the length of the secondary vane when fully extended. In a fully closed and fully extended position, the dual vane may block a portion of the volute slot in a range of about 190° to 270° of the volute slot. Or, in a fully closed and fully extended position, the dual vane blocks a portion of the volute slot in a range of about 270° to 360° of the volute slot. Generally speaking, the length of the dual vane, when the secondary vane is fully retracted, is no greater than about 185° of the turbine wheel to avoid additional mechanisms or linkages to clear the turbine wheel). See e.g. Tables 1A and 1B. "About" as used here means plus (where appropriate) or minus 1% to the nearest degree. For example, about 90° means 89° to 91°, about 180° means 178° to 182°, about 270° mean 267° to 273°, and about 360° means 356° to 360° (there being no plus side).

In some embodiments, the downstream end of the secondary vane when in the fully retracted position may be even with that of the primary vane. In other embodiments, the downstream end of the secondary vane may extend farther downstream than that of the primary vane (essentially becoming the far end of the dual vane). This arrangement effectively extends the amount of the volute slot blocked by the primary vane when fully closed past that provided by the length of the primary vane (with the secondary vane still in, the fully retracted position).

TABLE 1A

Amount of Volute Slot Blocked for Varying Lengths of Primary and Secondary Vanes (in Degrees of Arc).

| | | Length of Primary Vane | | | | | | | | | |
|---|---|---|---|---|---|---|---|---|---|---|---|
| | | 75 | 80 | 85 | 90 | 95 | 100 | 105 | 110 | 115 | 120 | 125 |
| Length of Secondary Value | 60 | 135 | 140 | 145 | 150 | 155 | 160 | 165 | 170 | 175 | 180 | 185 |
| | 70 | 145 | 150 | 155 | 160 | 165 | 170 | 175 | 180 | 185 | 190 | 195 |
| | 75 | 150 | 155 | 160 | 165 | 170 | 175 | 180 | 185 | 190 | 195 | 200 |
| | 80 | | 160 | 165 | 170 | 175 | 180 | 185 | 190 | 195 | 200 | 205 |
| | 85 | | | 170 | 175 | 180 | 185 | 190 | 195 | 200 | 205 | 210 |
| | 90 | | | | 180 | 185 | 190 | 195 | 200 | 205 | 210 | 215 |
| | 95 | | | | | 190 | 195 | 200 | 205 | 210 | 215 | 220 |
| | 100 | | | | | | 200 | 205 | 210 | 215 | 220 | 225 |
| | 105 | | | | | | | 210 | 215 | 220 | 225 | 230 |
| | 110 | | | | | | | | 220 | 225 | 230 | 235 |
| | 115 | | | | | | | | | 230 | 235 | 240 |
| | 120 | | | | | | | | | | 240 | 245 |
| | 125 | | | | | | | | | | | 250 |

By way of a non-limiting example, the downstream end of the secondary vane may extend about 0°, 5°, 10°, 15°, 20°, or some other amount past that of the primary vane when the secondary vane is in the fully retracted position, the maximum full length of the dual vane when the secondary vane is fully retracted being no greater than about 185°. For example, if the primary vane's length is 90° of the turbine wheel, the secondary vane's length may be in a range of 95° to 185° of the turbine wheel, there being in both cases 90° of overlapping length with the primary vane and, respectively, 5° to 95° of non-overlapping length (when fully retracted). Continuing with this example, when the primary vane is fully closed and the secondary vane is fully extended, the dual vane blocks, respectively, about 185° to 275° of the volute slot.

TABLE 1B

Amount of Volute Slot Blocked for Varying Lengths of Primary and Secondary Vanes (in Degrees of Arc).

| | | Length of Primary Vane | | | | | | | | | | | |
|---|---|---|---|---|---|---|---|---|---|---|---|---|---|
| | | 130 | 135 | 140 | 145 | 150 | 155 | 160 | 165 | 170 | 175 | 180 | 185 |
| Length of Secondary Value | 60 | 190 | 195 | 200 | 205 | 210 | 215 | 220 | 225 | 230 | 235 | 240 | 245 |
| | 70 | 200 | 205 | 210 | 215 | 220 | 225 | 230 | 235 | 240 | 245 | 250 | 255 |
| | 75 | 205 | 210 | 215 | 220 | 225 | 230 | 235 | 240 | 245 | 250 | 255 | 260 |
| | 80 | 210 | 215 | 220 | 225 | 230 | 235 | 240 | 245 | 250 | 255 | 260 | 265 |
| | 85 | 215 | 220 | 225 | 230 | 235 | 240 | 245 | 250 | 255 | 260 | 265 | 270 |
| | 90 | 220 | 225 | 230 | 235 | 240 | 245 | 250 | 255 | 260 | 265 | 270 | 275 |
| | 95 | 225 | 230 | 235 | 240 | 245 | 250 | 255 | 260 | 265 | 270 | 275 | 280 |
| | 100 | 230 | 235 | 240 | 245 | 250 | 255 | 260 | 265 | 270 | 275 | 280 | 285 |
| | 105 | 235 | 240 | 245 | 250 | 255 | 260 | 265 | 270 | 275 | 280 | 285 | 290 |
| | 110 | 240 | 245 | 250 | 255 | 260 | 265 | 270 | 275 | 280 | 285 | 290 | 295 |
| | 115 | 245 | 250 | 255 | 260 | 265 | 270 | 275 | 280 | 285 | 290 | 295 | 300 |
| | 120 | 250 | 255 | 260 | 265 | 270 | 275 | 280 | 285 | 290 | 295 | 300 | 305 |
| | 125 | 255 | 260 | 265 | 270 | 275 | 280 | 285 | 290 | 295 | 300 | 305 | 310 |
| | 130 | 260 | 265 | 270 | 275 | 280 | 285 | 290 | 295 | 300 | 305 | 310 | 315 |
| | 135 | | 270 | 275 | 280 | 285 | 290 | 295 | 300 | 305 | 310 | 315 | 320 |
| | 140 | | | 280 | 285 | 290 | 295 | 300 | 305 | 310 | 315 | 320 | 325 |
| | 145 | | | | 290 | 295 | 300 | 305 | 310 | 315 | 320 | 325 | 330 |
| | 150 | | | | | 300 | 305 | 310 | 315 | 320 | 325 | 330 | 335 |
| | 155 | | | | | | 310 | 315 | 320 | 325 | 330 | 335 | 340 |
| | 160 | | | | | | | 320 | 325 | 330 | 335 | 340 | 345 |
| | 165 | | | | | | | | 330 | 335 | 340 | 345 | 350 |
| | 170 | | | | | | | | | 340 | 345 | 350 | 355 |
| | 175 | | | | | | | | | | 350 | 355 | 360 |
| | 180 | | | | | | | | | | | 360 | |

The A/R (Area/Radius) ratio of the housing progressively varies as the primary vane pivots between the fully opened and fully closed positions and continues to vary as the secondary vane extends to, and retracts from, its fully extended position. Regardless of the vanes' position, when the volute slot blocker is in its fully closed position inlet exhaust gas is prevented from flowing into the volute slot (and therefore the turbine wheel) until the gas passes the far end of the blocker. When the pivoting vane is in the fully opened position, the initial (first) inlet throat area may remain unaltered and, therefore, so does the A/R ratio of the housing. When the pivoting vane is in the fully closed position, the inlet throat area changes to a first revised inlet throat area having a reduced cross-sectional area. When the vane extends to the fully extended position, the inlet throat area changes, with each degree of extension, to a second revised inlet throat area having a reduced cross-sectional area.

Referring to the drawings, a turbocharger "T" of this disclosure include a housing 10 containing an inlet or throat section 11 that ends at a downstream end 17 of the tongue 15; a volute 13 that may continuously decrease in area and cross section from an initial cross section 21 of the throat 11; a volute slot 25 located along a midline 23 of the volute 13 into which inlet exhaust gas entering the throat 11 can flow; and a turbine inducer or wheel area 29 exposed to the volute slot 25 and, therefore, the inlet exhaust gas flow. In embodiments of this disclosure, the housing 10 includes a dual or two-part vane 40 that effectively extends the inlet throat area farther downstream and, therefore, varies the A/R ratio of the housing 10. A single dual vane 40 services the volute 13. The vane 40 is configured such that, when fully closed and when fully closed and extended, inlet exhaust gas flowing over the vane 40 is blocked or prevented from entering the volute slot 25 and, therefore, the wheel area 29, until it passes the vane 40.

The dual vane 40 is comprised of two complementary vanes: a primary vane 50 which pivots and a secondary vane 60 that slides. When in an assembled state within the housing 10, a longitudinal centerline 41 of the dual vane 40 is aligned with a vertical centerline 33 of the volute slot 25. The dual vane 40 may be sized widthwise such that it can be received by the volute slot 25 yet still block flow into the slot 25 or can be sized wider than the slot 25. Making the vane 40 wider than slot 25 serves to raise the dual vane 40 higher in the volute 13, thereby decreasing the cross-sectional area above the vane 40. When the dual vane 40 pivots to a fully closed position, a first portion α1 of the volute slot 25 is blocked. This first portion α1 may be equal to the length of the primary vane 50 plus a length of any non-overlapping portion 62 of the secondary vane 60 when in the fully retracted position. When the secondary vane 60 is extended, a second additional portion α2 of the volute slot is blocked. This second portion α2 may be equal to the length of the secondary vane when extended less the length of the non-overlapping portion 62 (when fully retracted). The first and second portions α1, α2 may be equal to the overall length of the vanes 50, 60, respectively.

The primary or pivoting vane 50 may be located within the housing 10 at, or proximal to, the downstream end 17 of the tongue 15. The primary vane 50 effectively extends the throat 11 farther downstream in the volute 13 to provide an extended throat 12 having reduced cross-section area 23A (and therefore a different A/R ratio. The primary vane 50 may include a hole 52 at its upstream end 55 that receives a pin or cross shaft 53, permitting the vane 50 to pivot between a fully opened position "O" and a fully closed position "C". Or, the shaft 53 may be the upstream end 55 of the vane 50. The cross shaft 53 may be located so that it does not affect, or has a negligible effect on, the inlet cross section area 21. In embodiments, the cross shaft 53 may be located at the horizontal centerline 14 of the inlet or throat 11 or below the horizontal centerline 14. In some embodiments, the shaft 53 is aligned with the downstream end 17 of the tongue 15. The vane 50 may be configured to extend up to about 175°, 180°, or 185° of the turbine volute slot 25 or turbine wheel 29, the center rotational axis 31 of the wheel 29 defining the center point of the vane arc or length. Lengths past 185° may be used—alone or in combination with the secondary vane 60—but involve more complicated linkages to ensure the vane 50 clears the wheel 29.

The secondary or sliding vane 60 rides on top of the primary vane 50 in sliding relation to the primary vane 50. The vane 60 may be contained in a crosspiece 43. The vanes 50, 60 are shaped complementary to one another, with the secondary vane 60 sliding between a fully retracted position "R" and a fully extended position "E." In some embodiments, secondary vane 60 may reside in a slot or channel 61 located along a top surface 51 of the primary vane 50. Channel 61 may be an exposed channel, meaning that a portion 63 of the top surface 65 of the vane 61 is exposed when in the channel 61. The downstream end 67 of the secondary vane 60 may extend past the downstream end 57 of the primary vane 50, effectively serving as the downstream end 47 of the dual vane 40. As the secondary vane 60 extends, the throat section 12 extends even farther downstream in the volute 13—that is, past a downstream end 57 of the primary vane 50 up to its fully extended position E—to provide another, further reduced cross-section area 23B during its extension. The secondary vane 60 may be configured to extend from the downstream end 57 of the primary vane up to about 270° of the turbine wheel 29 or up to about 360°, therefore functioning as an exhaust brake. A stop 69, arranged perpendicular to the longitudinal centerline 41 of the dual vane 40, may be provided to prevent the secondary vane 60 from entering the volute slot 25 during extension and retraction.

To actuate the dual vane 40, a push rod 70 may be connected to the secondary vane 60. In some embodiments, the connection to secondary vane 60 may be a pivotal connection 71, for example, with push rod 70 connected at one end 73 to a pin or shaft 75. As the rod 70 moves axially, it pivots the primary vane 50 about its cross shaft 53 and the push rod's end 73 pivots about it shaft 75. When the primary vane 50 reaches its end of pivoting movement or travel toward the volute slot 25, the push rod 70 may continue its axial movement, extending the second vane 60 farther downstream. An ear 18 may be added to the housing 10 to accommodate the push rod 70, with one end 77 of the push rod 70 lying outside of the ear 18 or housing 10.

The dual vane 40 may further include a first stop 4569 and a second stop 69. The stops 45, 69 may be wider than the volute slot 25 and may be configured to contact the push rod connection 71. When the push rod 70 contacts the upstream first stop 45, the primary vane 50 is permitted to pivot between the fully opened and closed positions O, C as well as intermediate positions. With the vane 50 fully closed, the secondary vane 50 is permitted to slide into the fully extended position E and block additional portions α2 of the slot 25 as the rod 70 moves toward the downstream stop 45. The first and second stops 43, 69 may be spaced according to a predetermined length of arc depending, in part, on the amount of full extension desired.

Computerized control means may be configured to actuate and control the push rod 70 and, therefore, pivot and slide the vanes 50, 60. Changing the location of the primary vane's pivot point 53 or the push rod's connecting point 71 (or both points) affects the amount of pivot and extension. The fully opened position O occurs when the dual vane 40 reaches an end of its pivoting movement or travel toward the outer wall 27 of the volute 13. When in this position, the flow of the inlet exhaust gas may be unevenly distributed, with more flow under rather than over the dual vane 40. In some embodiments, in the fully opened position O a portion 41 of the dual vane 40 may contact the wall 27 of the volute 13. In other embodiments, in the fully opened position O, or in a partially opened position C, the dual vane 40 may lie between a horizontal centerline 14 of the volute 13 and the wall 27, the centerline 14 representing a neutral position. Pivot positions between the centerline 14 and the volute slot 25 may represent partially closed positions. A neutral position essentially splits or defines volute 13 into an upper and lower half, with an equal volume of exhaust flowing over and under the vane 40. The fully closed position C occurs when the dual vane 40 reaches an end of its pivoting movement or travel toward the volute slot 25.

Between the fully opened and closed positions, the secondary vane remains in its fully retracted position R. When in the fully closed position C the dual vane 40 prevents inlet exhaust gas from entering the volute slot 25 until the gas passes the downstream end 57, 67 of the vane 40. A reduced cross section 23A, relative to the initial throat cross section 21, results. The secondary vane 60 may then be extended up to its fully extended position E, providing a further reduced cross-section 23B as it extends. When in any position other than the fully closed position C, the A/R ratio of the turbocharger T or housing 10 remains unaltered.

While embodiments of the dual vane have been described, the invention itself is defined by the following claims. The claims include the full range of equivalents to which each recited element is entitled.

What is claimed:

1. A turbocharger comprising:
a housing including a volute containing an inlet throat section and a volute slot;
a dual vane co-aligned with the volute slot, an upstream end of the dual vane located in proximity to a downstream end of the inlet throat section;
the dual vane including a primary vane and a secondary vane, the secondary vane disposed on an upper surface of the primary vane and shaped complementary to the primary vane, the primary vane configured to pivot away from and toward the volute slot between a fully opened position and a fully closed position, the secondary vane configured to slide between a fully retracted position and a fully extended position;
wherein the secondary vane is in the fully retracted position when the primary vane pivots between the fully opened and closed positions;
wherein in the fully closed position, a portion of the volute slot lying below the dual vane is blocked and the secondary vane may extend from the fully retracted position;
wherein when the secondary vane is extended, an additional portion of the volute slot lying below the dual vane is blocked.

2. The turbocharger of claim 1, further comprising:
a push rod including one end pivotally connected to the secondary vane and another end located outside of the housing;
the push rod configured to pivot the primary vane between the fully opened and closed positions and, when the primary vane is in the fully closed position, extend and retract the secondary vane.

3. The turbocharger of claim 2, further comprising:
the dual vane including an upstream stop and a downstream stop;
wherein when the push rod contacts the upstream stop, the primary vane is permitted to pivot between the fully opened and closed positions;
wherein when the push rod moves between the upstream and downstream stops, the secondary vane is permitted to slide between the fully extended and retracted positions, the fully extended position being when the push rod contacts the downstream stop, the fully retracted position being when the push rod contacts the upstream stop.

4. The turbocharger of claim 3, wherein in a fully closed and fully extended position, the dual vane blocks a portion of the volute slot in a range of 190° to 270° of the volute slot.

5. The turbocharger of claim 3, wherein in a fully closed and fully extended position, the dual vane blocks a portion of the volute slot in a range of 270° to 360° of the volute slot.

6. The turbocharger of claim 3, wherein in a fully closed and fully extended position, the dual vane blocks 360° of the volute slot.

7. The turbocharger of claim 1, wherein an A/R ratio of the housing varies as the primary vane pivots between the fully opened and closed positions.

8. The turbocharger of claim 7, wherein the A/R ratio of the housing varies as the secondary vane slides between the fully extended and retracted positions.

9. The turbocharger of claim 1, further comprising:
a channel located on the upper surface of the primary vane, at least a portion of the secondary vane located within the channel.

10. The turbocharger of claim 1, further comprising:
a cross shaft, the primary vane connected at its upstream end to the cross shaft.

11. The turbocharger of claim 1, further comprising:
a downstream end of the secondary vane including a stop having a width greater than that of the volute slot, the stop configured to prevent the downstream end of the secondary vane from entering into the volute slot.

12. A dual vane configured for use in a housing of a turbocharger, the dual vane comprising:
a primary vane including a hole at an upstream end of the primary vane configured to receive a shaft, the primary vane configured to pivot between a fully opened position and a fully closed position relative to a volute slot of the housing;
a secondary vane including a push rod connection on an upper surface of the secondary vane, the secondary vane disposed on an upper surface of the primary vane and shaped complementary to the primary vane, the secondary vane configured to slide between a fully retracted position and a fully extended position relative to the primary vane.

13. The dual vane of claim 12, wherein the secondary vane is in the fully retracted position when the primary vane pivots between the fully opened and closed positions.

14. The dual vane of claim 12, wherein when installed in the housing, a portion of a volute slot of the housing lying below the dual vane is blocked when the primary vane is in the fully closed position and the secondary vane may extend from the fully retracted position.

15. The dual vane of claim 14, wherein when the secondary vane is extended, an additional portion of the volute slot lying below the dual vane is blocked.

16. The dual vane of claim 12, further comprising:
a push rod including one end connected to the push rod connection of the secondary vane;
the push rod configured to pivot the primary vane between the fully opened and closed positions and, when the primary vane is in the fully closed position, extend and retract the secondary vane.

17. The dual vane of claim 16, further comprising:
the dual vane including an upstream stop and a downstream stop;
wherein when the push rod contacts the upstream stop, the primary vane is permitted to pivot between the fully opened and closed positions;
wherein when the push rod moves between the upstream and downstream stops, the secondary vane is permitted to slide between the fully extended and retracted positions, the fully extended position being when the push rod contacts the downstream stop, the fully retracted position being when the push rod contacts the upstream stop.

18. The dual vane of claim 12, further comprising:
a channel located on the upper surface of the primary vane, at least a portion of the secondary vane located within the channel.

19. The dual vane of claim 12, further comprising:
a downstream end of the secondary vane including a stop, a downstream end of the secondary vane including a stop having a width greater than that of the volute slot, the stop configured to prevent the downstream end of the secondary vane from entering into the volute slot.

20. A method for progressively varying an area/radius ratio of a turbocharger housing, the turbocharger housing including:
a dual vane located toward a downstream end of an inlet throat section of the turbocharger, the dual vane comprising:
a primary vane configured to pivot between a fully opened position and a fully closed position relative to a volute slot of the housing; and
a secondary vane disposed on an upper surface of the primary vane and shaped complementary to the primary vane, the secondary vane configured to slide between a fully retracted position and a fully extended position relative to the primary vane;
the method comprising:
pivoting the primary vane between the fully opened and fully closed positions, wherein during the pivoting the secondary vane remains in the fully retracted position; and
sliding the secondary vane between the fully retracted and fully extended positions when the primary vane is in the fully closed position;
wherein a portion of the volute slot lying opposite the primary vane is blocked when the primary vane is in the fully closed position; and
wherein an additional portion of the volute slot is lying opposite the secondary vane is blocked when the secondary vane slides toward the fully extended position.

* * * * *